United States Patent
Oberli

[15] 3,635,094
[45] Jan. 18, 1972

[54] AUTOMATIC TRANSFER PIPETTE MEANS

[72] Inventor: Rudolf Oberli, Langenthal, Switzerland
[73] Assignee: Greiner Electronic AG, Langenthal, Switzerland
[22] Filed: Aug. 27, 1970
[21] Appl. No.: 67,400

[30] Foreign Application Priority Data

Sept. 6, 1969 Switzerland..........................13478/69

[52] U.S. Cl. .........................................................73/423 A
[51] Int. Cl. ......................................................G01n 1/14
[58] Field of Search..................73/423 A; 23/253, 259, 292; 137/392; 141/198; 210/97, 104

[56] References Cited

UNITED STATES PATENTS

| | | | |
|---|---|---|---|
| 3,424,557 | 1/1969 | Skeggs | 23/253 |
| 3,527,267 | 9/1970 | Moore | 141/198 |
| 3,504,205 | 3/1970 | Sheckler | 141/198 |

*Primary Examiner*—S. Clement Swisher
*Attorney*—Lawrence E. Laubscher

[57] ABSTRACT

Automatic transfer pipette means for withdrawing a given quantity of a liquid specimen from an open-topped container, characterized by the provision of means for automatically submerging a downwardly depending pipette a given distance beneath the level of the liquid. The pipette is displaced vertically relative to the container by an operating arm that also carries liquid level sensing means which are operable to position the arm a given distance above the liquid level, thereby submerging the pipette to the desired depth.

10 Claims, 2 Drawing Figures

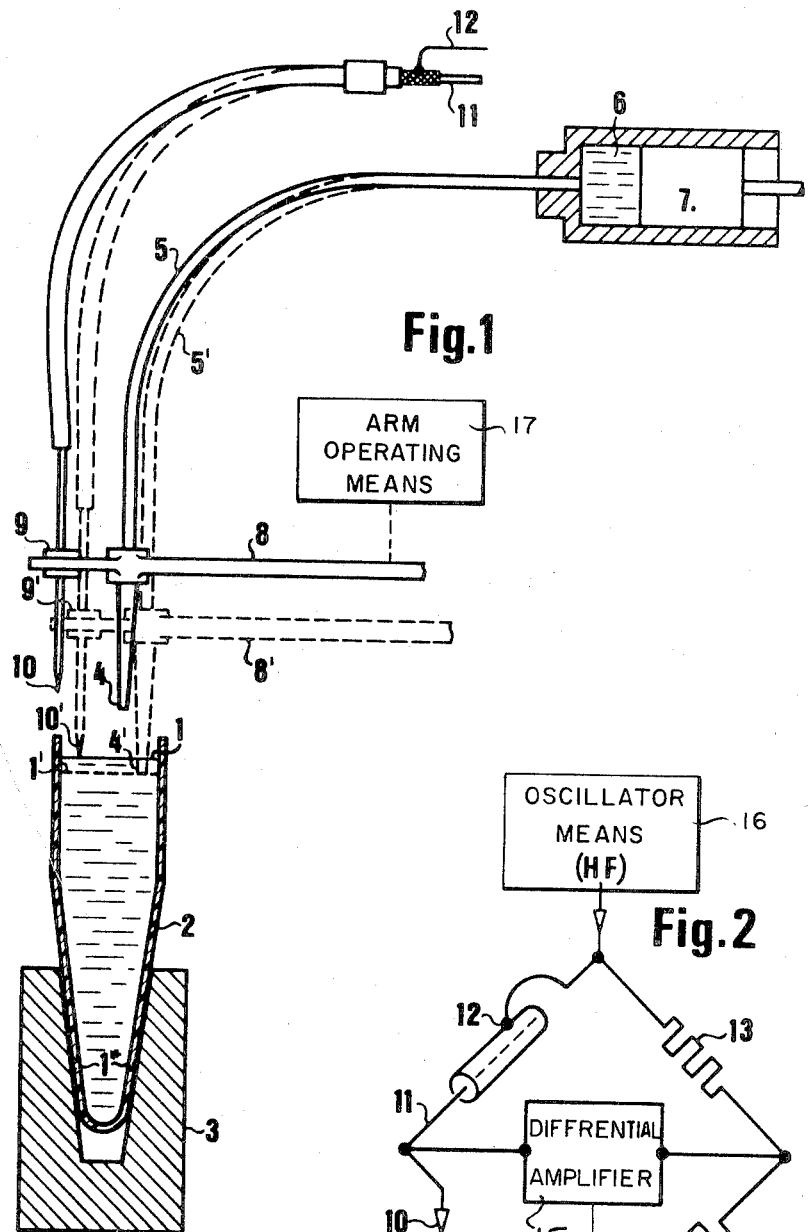

AUTOMATIC TRANSFER PIPETTE MEANS

The present invention relates generally to transfer pipette means for removing, by suction, the upper portion of a liquid specimen contained in an open-topped container. One known drawback of such transfer pipette means is that there is always the danger that residues adhering to the external surface of the pipette will contaminate a following specimen into which the pipette is introduced. In order to avoid this drawback of the known transfer pipette apparatus it is proposed, in accordance with a primary object of the present invention, to submerge the pipette only to a depth corresponding with the volume of the liquid being withdrawn from the container, whereby the likelihood of contamination of the remaining liquid in the container is greatly alleviated.

A more specific object of the invention is to provide automatic transfer pipette means including liquid level sensing means for automatically detecting the level of the liquid, and for submerging the orifice of a downwardly directed pipette to a given depth beneath said liquid level. Preferably the depth to which the orifice of the pipette is submerged is a function of the cross-sectional area of the container, so that the desired quantity of liquid to be transferred will be contained wholly above the level to which said pipette orifice is submerged.

According to a more specific object of the invention, the level sensing means includes a probe that is connected in a balanced capacitance bridge circuit, in combination with differential amplifier means connected across the bridge for operating arm positioning means to automatically position the pipette carrier arm at a desired distance above the liquid level, and, consequently, to submerge the orifice of the downwardly extending pipette to a given depth beneath the liquid level.

Other objects and advantages of the invention will become apparent from a study of the following specification when viewed in the light of the accompanying drawing, in which:

FIG. 1 is a generally diagrammatic sectional view of the specimen withdrawing means; and FIG. 2 is an electrical schematic diagram of the capacity bridge means for automatically positioning the pipette orifice at a given depth beneath the liquid level.

Referring first more particularly to FIG. 1, the liquid specimen having an exposed upper surface 1 is contained in an open-topped container 2 that is preferably formed of a suitable insulating material, such as a synthetic plastic material or glass. The container 2 is supported by the fixed metal stand 3 above which is arranged the downwardly depending pipette 4 that is connected by flexible conduit 5 with the measuring chamber 6 of piston and cylinder suction withdrawal means 7.

The pipette 4 is carried by the movable operating arm 8 that is vertically displaceable by the arm operating means 17. Also carried by the arm 8 are probe means including the pointed end portion 10 of the inner conductor 11 of a coaxial cable, said end portion being rigidly connected with the arm by the insulating sleeve 9.

Referring now to FIG. 2, the inner and outer conductors 11 and 12 of the coaxial probe cable are connected to define one arm of a capacitance bridge across a first pair of diagonal terminals of which is connected a source of high frequency energy (namely, the oscillator means 16 having ground return E). The probe 10 and metal stand 3 are connected to define an adjacent arm of the bridge, the remaining arms of the bridge being defined by resistors 13 and 14, respectively. The insulating material from which the container is formed adds a further capacitance effect to the corresponding bridge arm, the dielectric loss of the container corresponding generally with that of the high frequency coaxial probe cable. In the event that the probe tip 10 touches the liquid level 1, the container capacitance is directly connected in the bridge arm, the resistance values of the resistors 13 and 14 being selected to generally effect a balanced bridge condition. No significant residual phase error exists when the synthetic plastic material of the container has a dielectric loss similar to that of the probe cable.

The differential amplifier 15 includes input terminals that are connected across the remaining diagonals of the bridge, and the output terminals of the amplifier are connected with the arm operating means 17. When the probe tip 10 is spaced from the liquid surface 1, the bridge is greatly unbalanced to cause differential amplifier 15 to supply arm operating means 17 with a control signal that causes arm 8 and pipette 4 to move downwardly toward the container, said downward movement being terminated only when the probe tip 10 reaches a position relative to the liquid level 1 to achieve a balanced bridge condition in which there is no output from the amplifier 15, and the arm operating means is deactivated.

By vertically adjusting the probe tip 10 in its insulating sleeve 9 relative to the pipette carrier arm 8, the arm operating means may be controlled as a function of the detected level of the liquid in such a manner that a desired level 1' of the pipette orifice 4 is achieved. Thus, if the probe tip 10 is moved upwardly relative to the arm 8 and pipette orifice 4, the orifice will be submerged by a corresponding greater extent beneath the liquid surface 1. Such a position of the orifice 4', probe 10' and new liquid surface 1' is illustrated in phantom in FIG. 1; obviously, the smallest depth of immersion 1 to 1' of orifice 4' is obtained if, at the end of each suction withdrawal cycle, the orifice does not leave, but barely remains at, the liquid surface.

To further prevent contamination of the liquid specimen, the pipette orifice 4 and the probe tip 10 are preferably provided, when chemical and electrical requirements permit, with a suitable nonwettable surface. While probe tip 10' is barely immersed in the liquid and has an outer diameter that is a mere fraction of that of orifice 4'—and thus contributes little to the removal of liquid—additional protection may be achieved by so designing the system that the probe never actually touches the liquid surface 1 but merely serves as a capacitance-type proximity detector (in which case the air gap between the probe tip and the liquid affords a further capacitive effect to the corresponding bridge arm). Such proximity type of level detecting probes are generally limited to use with open-topped containers, since the walls of the container, top members or labels would otherwise interfere with the measuring effect.

While in accordance with the Patent Statutes, the preferred form and embodiment of the invention has been illustrated and described, it will be apparent that various changes and modifications may be made without deviating from the disclosed invention.

What is claimed is:

1. Pipette means for automatically withdrawing a given quantity of liquid from an open-topped container, comprising
   a stand (3) adapted to support said open-topped container;
   means including a downwardly depending pipette (4) for withdrawing liquid from said container; and
   means for inserting said pipette downwardly into said container to a given depth beneath the level (1) of liquid contained within said container, said pipette inserting means including arm means (8) carrying said downwardly depending pipette, liquid level sensing means (10) connected with said arm means for detecting the level of the liquid in the container, and arm operating means (17) operable by said liquid level sensing means for positioning said arm means at such a height relative to said liquid level as to cause said downwardly depending pipette to be submerged to said given depth.

2. Apparatus as defined in claim 1, and further including means for adjusting the depth to which said pipette is submerged beneath the liquid level by said pipette inserting means, thereby varying the quantity of liquid that is withdrawn from said container.

3. Apparatus as defined in claim 1, wherein said arm operating means is operable to displace said arm means in the direction of said liquid level, and further wherein said liquid level sensing means comprises proximity detection means for deactivating said arm operating means when said arm means is spaced a given distance from said liquid level.

4. Apparatus as defined in claim 1, wherein said liquid level sensing means comprises a probe adapted to engage the surface of the liquid.

5. Apparatus as defined in claim 4, wherein said liquid defines an electrode, and further wherein said level sensing means includes a voltage source, and means connecting the terminals of said voltage source with said probe and with said liquid electrode, respectively.

6. Apparatus as defined in claim 5, wherein said means connecting said voltage source with said probe and said liquid electrode comprises capacitance bridge means.

7. Apparatus as defined in claim 6, wherein said probe means comprises the inner conductor of a coaxial cable, wherein the inner and outer conductors of said coaxial cable are so connected in said capacitance bridge means that the capacitance between said conductors defines a first capacitive arm of said bridge means, and further wherein the capacitance between said probe and the liquid electrode comprises a second capacitive arm of said bridge means.

8. Apparatus as defined in claim 7, wherein said capacitive bridge means is normally balanced, and further including differential amplifier means (15) having an input connected across the balanced diagonals of said capacitive bridge means and an output connected with said arm operating means.

9. Apparatus as defined in claim 6, wherein said container (2) is formed of insulating material, and further wherein said stand is formed of metal and is so connected in said capacitive bridge means that the wall of said container serves as a dielectric for establishing a second capacitance effect in series in said second bridge arm.

10. Apparatus as defined in claim 9, wherein said probe comprises a fine wire tip that is partially immersed in the liquid and includes at the point of immersion a diameter that is a fraction of that of the orifice of the pipette.

* * * * *